(12) United States Patent
Abe

(10) Patent No.: US 11,023,459 B2
(45) Date of Patent: Jun. 1, 2021

(54) METHOD, APPARATUS FOR DATA GENERATION, AND NON-TRANSITORY COMPUTER-READABLE STORAGE MEDIUM FOR STORING PROGRAM

(71) Applicant: FUJITSU LIMITED, Kawasaki (JP)

(72) Inventor: Shuya Abe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 172 days.

(21) Appl. No.: 16/377,355

(22) Filed: Apr. 8, 2019

(65) Prior Publication Data

US 2019/0354520 A1 Nov. 21, 2019

(30) Foreign Application Priority Data

May 15, 2018 (JP) .............................. JP2018-093899

(51) Int. Cl.
*G06F 16/242* (2019.01)
*G06F 16/22* (2019.01)
*G06F 16/2455* (2019.01)
*G06F 16/901* (2019.01)
*G06F 16/2458* (2019.01)

(52) U.S. Cl.
CPC ...... *G06F 16/2423* (2019.01); *G06F 16/2272* (2019.01); *G06F 16/244* (2019.01); *G06F 16/2456* (2019.01); *G06F 16/2462* (2019.01); *G06F 16/24561* (2019.01); *G06F 16/9024* (2019.01)

(58) Field of Classification Search
CPC ............. G06F 16/2272; G06F 16/2423; G06F 16/244; G06F 16/2455; G06F 16/2456; G06F 16/24561; G06F 16/2462; G06F 16/80; G06F 16/83; G06F 16/8358; G06F 16/84; G06F 16/86; G06F 16/9024
See application file for complete search history.

(56) References Cited

U.S. PATENT DOCUMENTS

| | | | |
|---|---|---|---|
| 8,037,108 B1 * | 10/2011 | Chang | G06F 16/214 |
| | | | 707/803 |
| 9,129,038 B2 * | 9/2015 | Begel | G06F 8/74 |
| 2006/0235823 A1 * | 10/2006 | Chong | G06F 16/2455 |

(Continued)

FOREIGN PATENT DOCUMENTS

| JP | 2006-221312 | 8/2006 |
|---|---|---|
| JP | 2017-037486 | 2/2017 |

*Primary Examiner* — James E Richardson
(74) *Attorney, Agent, or Firm* — Fujitsu Patent Center

(57) ABSTRACT

A method for data generation performed by a computer includes: executing a collation process that includes acquiring reference source data representing a first axis and reference destination data representing a second axis and having a graph structure including a node and an edge, and collating a node of the reference destination data using a value of the acquired reference source data; executing a identification process that includes identifying a second node representing a kind of a first node sharing a first edge between a plurality of collation nodes collated by the collation process, and identifying a third node representing a definition of a domain of the first edge between the first node and the collation nodes; and executing a join process that includes associating the reference source data with the reference destination data based on the second node and the third node.

9 Claims, 17 Drawing Sheets

(56) References Cited

U.S. PATENT DOCUMENTS

| | | | |
|---|---|---|---|
| 2006/0235837 A1* | 10/2006 | Chong | G06F 16/24534 |
| 2010/0036862 A1* | 2/2010 | Das | G06F 16/86 |
| | | | 707/698 |
| 2012/0303668 A1* | 11/2012 | Srinivasan | G06F 16/288 |
| | | | 707/792 |
| 2017/0046327 A1 | 2/2017 | Goto et al. | |
| 2018/0314737 A1* | 11/2018 | Chong | G06F 16/2282 |

* cited by examiner

FIG. 2

| NAME | LOCATION | YEAR OF ESTABLISHMENT |
|---|---|---|
| COMPANY A | CITY A | 1935 |
| COMPANY B | CITY B | 1945 |
| COMPANY C | CITY C | 1955 |
| ... | ... | ... |

FIG. 3

```
                                                              ⌐23
  _:a   <NAME>                    "COMPANY A" ;
        <LOCATION>                "CITY A" ;
        <INDUSTRY TYPE>           "MANUFACTURING INDUSTRY" .

_:a1  <MAJOR SHAREHOLDER>       "COMPANY A" ;
        <LOCATION>                "CITY A1" .

_:a2  <ESTABLISHMENT>           "1935" ;

_:b   <NAME>                    "COMPANY B" ;
        <LOCATION>                "CITY B" ;
        <INDUSTRY TYPE>           "CONSTRUCTION INDUSTRY" .

_:c   <NAME>                    "COMPANY C" ;
        <LOCATION>                "CITY C" ;
        <INDUSTRY TYPE>           "AGRICULTURE" .
```

FIG. 5
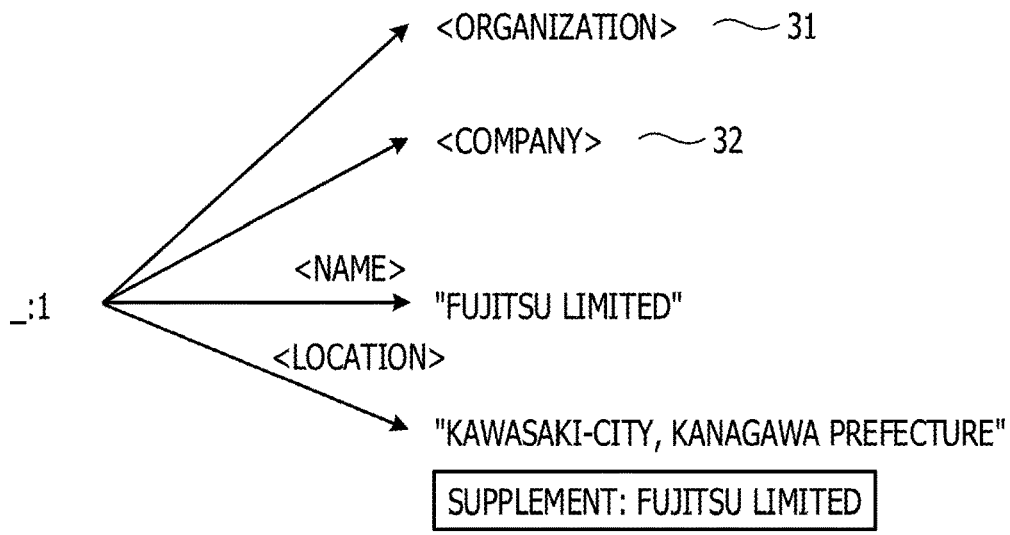
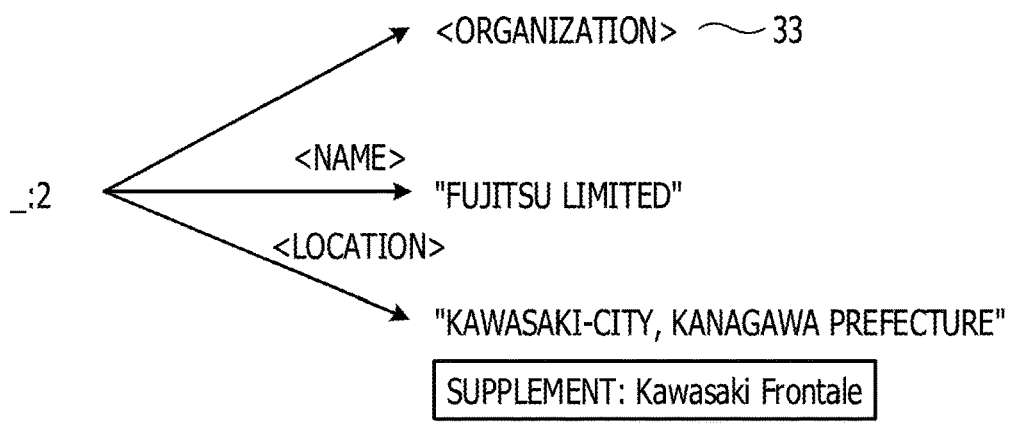
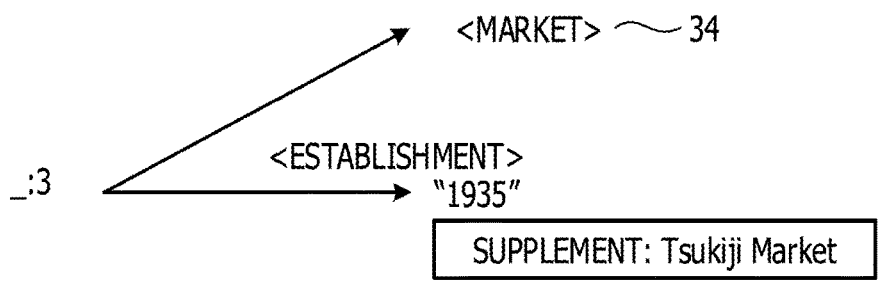

FIG. 10

Table 2:

| NAME | LOCATION | YEAR OF ESTABLISHMENT |
|---|---|---|
| COMPANY A | CITY A | 1935 |
| COMPANY B | CITY B | 1945 |
| COMPANY C | CITY C | 1955 |
| ... | ... | ... |

24:
```
select * where {
  optional {
    ?s ?p1    "COMPANY A"
  }
  optional {
    ?s ?p1    "CITY A"
  }
  optional {
    ?s ?p1    "1935"
  }
}
```

23:
```
_:a   <NAME>              "COMPANY A" ;
      <LOCATION>          "CITY A" ;
      <INDUSTRY TYPE>     "MANUFACTURING INDUSTRY" .

_:a1  <MAJOR SHAREHOLDER> "COMPANY A" ;
      <LOCATION>          "CITY A1" .

_:a2  <ESTABLISHMENT>     "1935" ;

_:b   <NAME>              "COMPANY B" ;
      <LOCATION>          "CITY B" ;
      <INDUSTRY TYPE>     "CONSTRUCTION INDUSTRY" .

_:c   <NAME>              "COMPANY C" ;
      <LOCATION>          "CITY C" ;
      <INDUSTRY TYPE>     "AGRICULTURE" .
```

25:

| SUBJECT | PREDICATE | OBJECT |
|---|---|---|
| _:a | <NAME> | "COMPANY A" |
| _:a | <LOCATION> | "COMPANY A" |
| _:a1 | <MAJOR SHAREHOLDER> | "COMPANY A" |
| _:a2 | <ESTABLISHMENT> | "1935" |

FIG. 12

Table 25:

| SUBJECT | PREDICATE | OBJECT |
|---|---|---|
| _:a | <NAME> | "COMPANY A" |
| _:a | <LOCATION> | "COMPANY A" |
| _:a1 | <MAJOR SHAREHOLDER> | "COMPANY A" |
| _:a2 | <ESTABLISHMENT> | "1935" |

Query 35:
```
select * where {
  _:a a ?t .
}
```

Table 50:

| SUBJECT | PREDICATE | OBJECT |
|---|---|---|
| _:a | <NAME> | "COMPANY A" |
| _:a | <LOCATION> | "COMPANY A" |
| _:a1 | <MAJOR SHAREHOLDER> | "COMPANY A" |
| _:a2 | <ESTABLISHMENT> | "1935" |
| _:a | a | <ORGANIZATION> |
| _:a | a | <COMPANY> |
| _:a1 | a | <ORGANIZATION> |
| _:a2 | a | <MARKET> |
| <LOCATION> | rdfs:domain | <ORGANIZATION> |
| <LOCATION> | rdfs:domain | <COMPANY> |
| <MAJOR SHAREHOLDER> | rdfs:domain | <ORGANIZATION> |
| <MAJOR SHAREHOLDER> | rdfs:domain | <COMPANY> |
| <ESTABLISHMENT> | rdfs:domain | <ORGANIZATION> |

Query 45:
```
select * where {
  <LOCATION> rdfs:domain ?d .
}
```

FIG. 14

| PREDICATE | COLUMN | SCORE |
|---|---|---|
| <NAME> | 0 | 0.3 |
| <NAME> | 1 | 0.2 |
| <NAME> | 2 | 0.1 |
| <LOCATION> | 0 | 0.2 |
| <LOCATION> | 1 | 0.3 |
| <LOCATION> | 2 | 0.1 |

METHOD, APPARATUS FOR DATA GENERATION, AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2018-93899, filed on May 15, 2018, the entire contents of which are incorporated herein by reference.

FIELD

The embodiments discussed herein are related to a method, an apparatus for data generation, and a non-transitory computer-readable storage medium for storing a program.

BACKGROUND

In recent years, there has been growing interest in collecting, accumulating, and retrieving data on various knowledge. Such data is considered to be represented by some kinds of graph data models. Known graph data models include a resource description framework (RDF).

In the data model of the RDF, the relationship in resources is represented by three elements of a subject, a predicate, and an object, which are referred to as a triple. In terms of the field of the graph, the subject and the predicate correspond to a node, and the predicate corresponds to an edge or a link. For example, the triple corresponds to two nodes and the edge connecting them in the graph. In the RDF, a set of a subject, a predicate, and an object, which is called a triple, is the minimum unit. The RDF data set is a set of triples. The predicate may be referred to as an attribute or a property, and the object may be referred to as a value of the attribute or a value of the property.

For example, the triple represented by "Fujitsu, Industry Type, Electrical Equipment" has the subject which is "Fujitsu", the predicate which is "industry type", and the object which is "electrical equipment", and indicates that "Fujitsu's industry type is electrical equipment". The subject and the predicate are represented by a uniform resource locator (URL), and the object is represented by a character string which is also called a URL or a character string literal.

A process of finding a triple corresponding to values in a table described by comma separated values (CSV) or the like from the RDF data set is conceivable. Performing this process makes it possible to use information which does not exist as information in the table but exists as an RDF data set. For example, the process is used in the case of determining the availability of financing by joining a table in which financial information of a loan customer company held by the bank is registered with the RDF data set as the company's open data.

When joining such an RDF data set and a table, the joining has been performed in the related art in the following procedure. First, a query is constructed using the values of the table, and the subject and the predicate that satisfy the condition are identified. Next, a score is calculated for each column of the table with respect to the identified predicate. The score is a value representing the likelihood that the predicate is a predicate corresponding to the column in the table, and represents the frequency at which the predicate appears in each column. Next, a query for finding, for each row of the table, the common subject whose predicate is the label of each column, and whose object is the value is created, and the subjects satisfying the conditions are identified. In a case where the result of collation with the predicate with the highest score has higher collation frequency than the result of collation with the predicate with the second highest score, the result of collation with the predicate with the highest score is made the final result. In a case where the result of collation with the predicate with the highest score has lower collation frequency than the result of collation with the predicate with the second highest score, the result of collation with the predicate with the second highest score and the result of collation with the predicate with the third highest score are compared. This comparison is repeated until the result of collation with the predicate with a specific score has higher collation frequency than the result of collation with the predicate with the highest score following the specific score. The predicate with the specific score is made the final result.

A technique of data collection using an RDF data set includes a related art technique of storing association information of an RDF description indicating an association between a plurality of resources, and updating the association information according to an operation on the resources. A related art technique includes identifying attribute information of each numerical value according to the arrangement of input areas to which the numerical values n numerical table data are input.

Examples of the related art include Japanese Laid-open Patent Publication No. 2006-221312, and Japanese Laid-open Patent Publication No. 2017-37486.

SUMMARY

According to an aspect of the embodiments, a method for data generation performed by a computer includes: executing a collation process that includes acquiring reference source data representing a first axis and reference destination data representing a second axis and having a graph structure including a node and an edge, and collating a node of the reference destination data using a value of the acquired reference source data; executing a identification process that includes identifying a second node representing a kind of a first node sharing a first edge between a plurality of collation nodes collated by the collation process, and identifying a third node representing a definition of a domain of the first edge between the first node and the collation nodes; and executing a join process that includes associating the reference source data with the reference destination data based on the second node and the third node.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of table type data;

FIG. 3 is a diagram illustrating an example of RDF data;

FIG. 5 is a diagram illustrating the acquisition result of the type of a subject;

FIG. 10 is a diagram illustrating an example of the query constructed by a first collation unit and collation results;

FIG. 12 is a diagram illustrating the query for obtaining additional information and the acquisition result of additional information;

FIG. 14 is a diagram illustrating an example of the calculation result of the predicate score;

DESCRIPTION OF EMBODIMENTS

Figure 1:
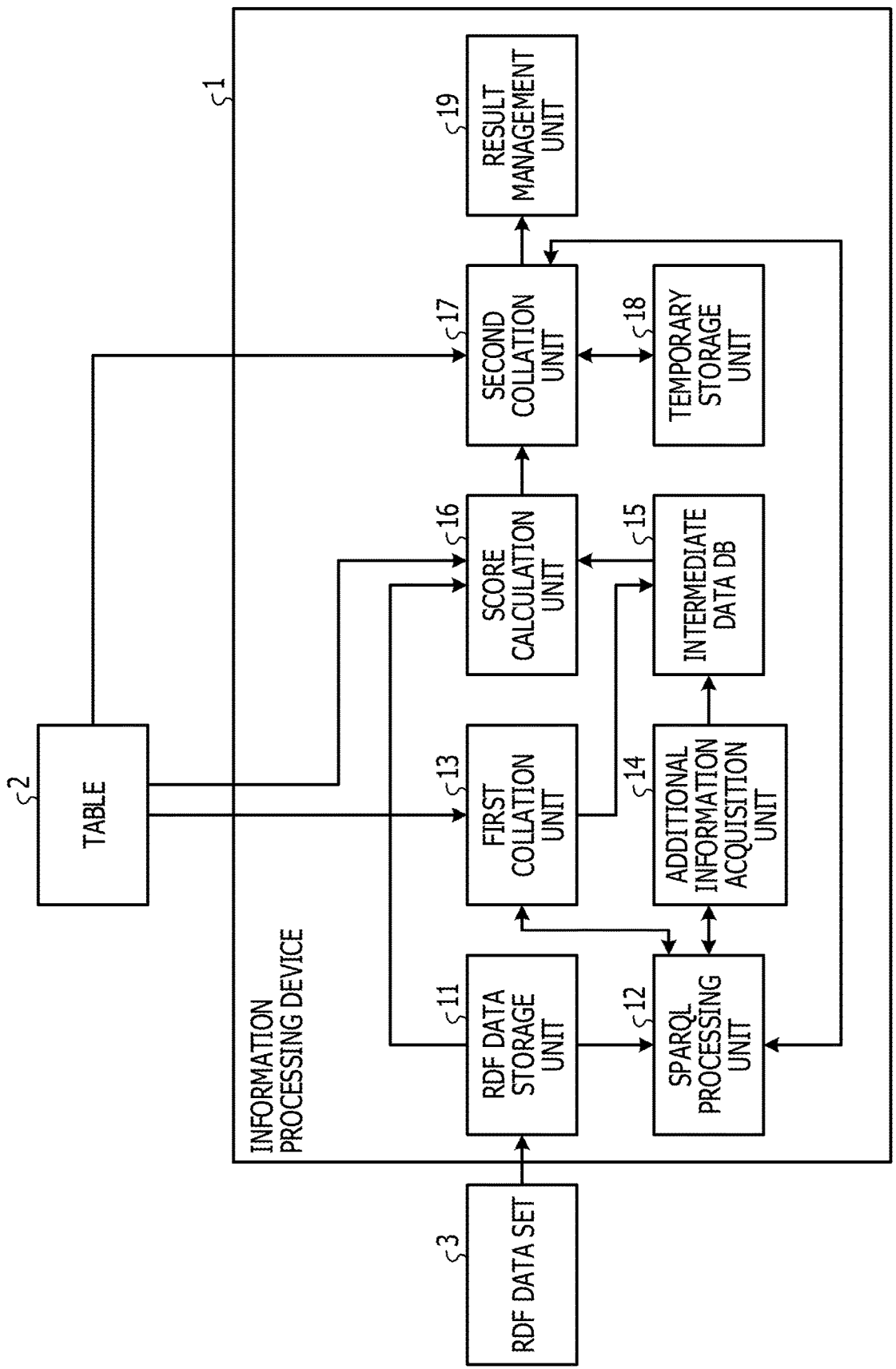
FIG. 1 is a block diagram of an information processing device.

However, the data set of graph data represents various kinds of things and events and relationships between them. For example, data sets in which various kinds of data coexist in such a manner that a plurality of databases are integrated using flexibility of a graph structure exist in graph data. As a specific example, some data sets of the RDF which is one of the graph data represent information such as companies, affiliated companies, persons, products, events and the like together with their relations.

In the process of detecting the subject and the predicate by collating the value of the table with the object in the RDF data set, various kinds of information included in the RDF data set related to that value are collated. For example, in a case where each row of the table data represents information on a company, when the value of the table data is collated with the RDF data set, the persons and products related to the company are also collated in addition to the company in the RDF data set. When the kind of information in the row of the table data and the kind of the RDF data are the same in the collation result, the correctness of the results is high, but when the kinds are different, the correctness of the results is low. Therefore, it may not be possible to derive the correct subject and predicate with respect to the value of the table in the collation described above by a score representing the mere appearance frequency of information in the RDF data set with respect to the information on the table data.

In the related art score calculation, the calculation is performed on the hypothesis that the predicate which corresponds to the values in the column with many appearance frequencies in the RDF data set of the collation result is likely to be the predicate corresponding to this column. For example, the predicate corresponding to each column is determined using a score expressing this hypothesis. However, various predicates are mixed in the collation result as described above. Therefore, the score of the predicate in which the kind of row information in the table data is different from the kind of the RFD data set may be high. From this, it is difficult to derive correct predicates under the above-mentioned hypothesis. For example, the predicate in the RDF data set corresponding to the column representing the company name in the table data is actually "name". However, when collating the name of a company, the score of "affiliation" related to a person may be high as a result of collation with a different kind of the RDF data set.

Even with the related art technique of updating the association information according to the operation on the resource, consideration is not given to a selection mistake of the predicate due to collation with a different kind of the RDF data set and a selection mistake of the predicate due to incorrectness of the score obtained by the related art technique. Therefore, it is difficult to improve the correctness of the data association even with this related art technique. In the related art technique of identifying the attribute information of each numerical value according to the arrangement of the input areas in the numerical table data, adaptation to association between data of different groups is not taken into consideration, so that it is difficult to improve the correctness of data association.

The disclosed technique is made in view of the above, and has an object to provide a data generation method, a data generation program, and an information processing device that improve the correctness of data association.

Hereinafter, embodiments of a data generation method, a data generation program, and an information processing device will be described in detail with reference to the drawings. The data generation method, the data generation program and the information processing device disclosed are not limited by the following embodiments.

Embodiments

FIG. 1 is a block diagram of an information processing device. As illustrated in FIG. 1, an information processing device 1 according to the present embodiment includes an RDF data storage unit 11, an SPARQL processing unit 12, a first collation unit 13, an additional information acquisition unit 14, an intermediate data DB 15, a score calculation unit 16, a second collation unit 17, a temporary storage unit 18, and a result management unit 19.

The information processing device 1 may access a table 2 and an RDF data set 3. The table 2 has a matrix structure. Items are assigned for each column of the table 2, and the values arranged in each column are classified into items. Values corresponding to each row of the table 2 are arranged. The table 2 is, for example, a CSV file or the like.

FIG. 2 is a diagram illustrating an example of table type data. The table 2 holds data of the format illustrated in FIG. 2, for example. In the table 2, each column represents items such as name, location, and year of establishment. In the table 2, values corresponding to each item are described for each item. In the table 2, the values of each item correspond to each row. This table 2 is an example of "reference source data". An arrangement of data represented by items corresponding to each column of the table, for example, an arrangement of data in each row, corresponds to an example of the "first axis".

The RDF data set 3 has a graph structure that expresses the relationship by connecting nodes by edge. The edge extends from one node to another node. In the triple represented by the subject, the predicate and the object, the node at the starting point of the edge represents the subject. The edge represents the predicate. The node at the edge arrival point is the object derived from the edge from the subject which is the node at the starting point of the edge. This RDF data set 3 is an example of "reference destination data".

The arrangement of data expressed by the graph structure corresponds to the "second axis".

FIG. 3 is a diagram illustrating an example of RDF data. The RDF data set 3 has subjects such as _: a, _: a1, _: a2, _: b and _: c in the case of FIG. 3. The subject is represented by a URL. Here, the information expressed in the form of underscores, colons and characters represents the URL corresponding to the character displayed there. In the case of FIG. 3, the RDF data set 3 has predicates such as <name>, <location>, <industry type>, <major shareholder> and <establishment>. The predicate is also represented by the URL. Here, the character enclosed by < > represents the URL corresponding to the character. In the case of FIG. 3, the RDF data set 3 has objects such as "company A", "city A", "manufacturing industry". The object is a URL or a literal (character string). Here, it is assumed that the object is represented by a character string, and the character surrounded by double quotation marks represents the character string itself.

The predicate representing a type exists in the RDF data. The type is a kind of specific subject or predicate. In the case of a triple having a predicate representing a type, the object is information indicating the type of the subject. The predicate representing a domain exist in the RDF data. The domain is a constraint on the type of the subject that a specific predicate may take. For example, in a case where "XXX" is described as a domain of definitions of a specific predicate, the type of the subject of the specific predicate is "XXX". In a case where a domain is not listed, there is no restriction on the type of the subject of the predicate. In the case of a triple having a predicate representing a domain, the object is information representing the domain in a case where the subject of the literal is a predicate.

The RDF data storage unit 11 has a storage device. The RDF data storage unit 11 acquires and stores the RDF data from the RDF data set 3. Hereinafter, a set of RDF data stored in the RDF data storage unit 11 is referred to as an RDF store.

The SPARQL processing unit 12 receives, from the first collation unit 13, the input of a query that instructs an acquisition of the subject and the predicate whose object is the value designated from the RDF store held by the RDF data storage unit 11. In accordance with the query received from the first collation unit 13, the SPARQL processing unit 12 acquires RDF data representing the subject or the predicate whose object is the value designated from the RDF store stored in the RDF data storage unit 11. When acquiring the subject or the predicate in the RDF data, the SPARQL processing unit 12 acquires the URL as a value. When acquiring the object in the RDF data, the SPARQL processing unit 12 acquires the literal as a value. The SPARQL processing unit 12 outputs the acquired value to the first collation unit 13 as the output source of the query.

The SPARQL processing unit 12 receives, from the additional information acquisition unit 14, the input of a query instructing an acquisition of information of the type of the subject or information of the domain of the predicate specified that is designated from the RDF store held by the RDF data storage unit 11. In accordance with the query received from the additional information acquisition unit 14, the SPARQL processing unit 12 acquires, from the RDF store stored in the RDF data storage unit 11, the value of the RDF data corresponding to the information of the type or the information of the domain. The SPARQL processing unit 12 outputs the acquired value to the additional information acquisition unit 14 which is the output source of the query.

The first collation unit 13 acquires each value of the table 2. The first collation unit 13 collates each value of the table 2 with the data included in the RDF store.

Figure 4:
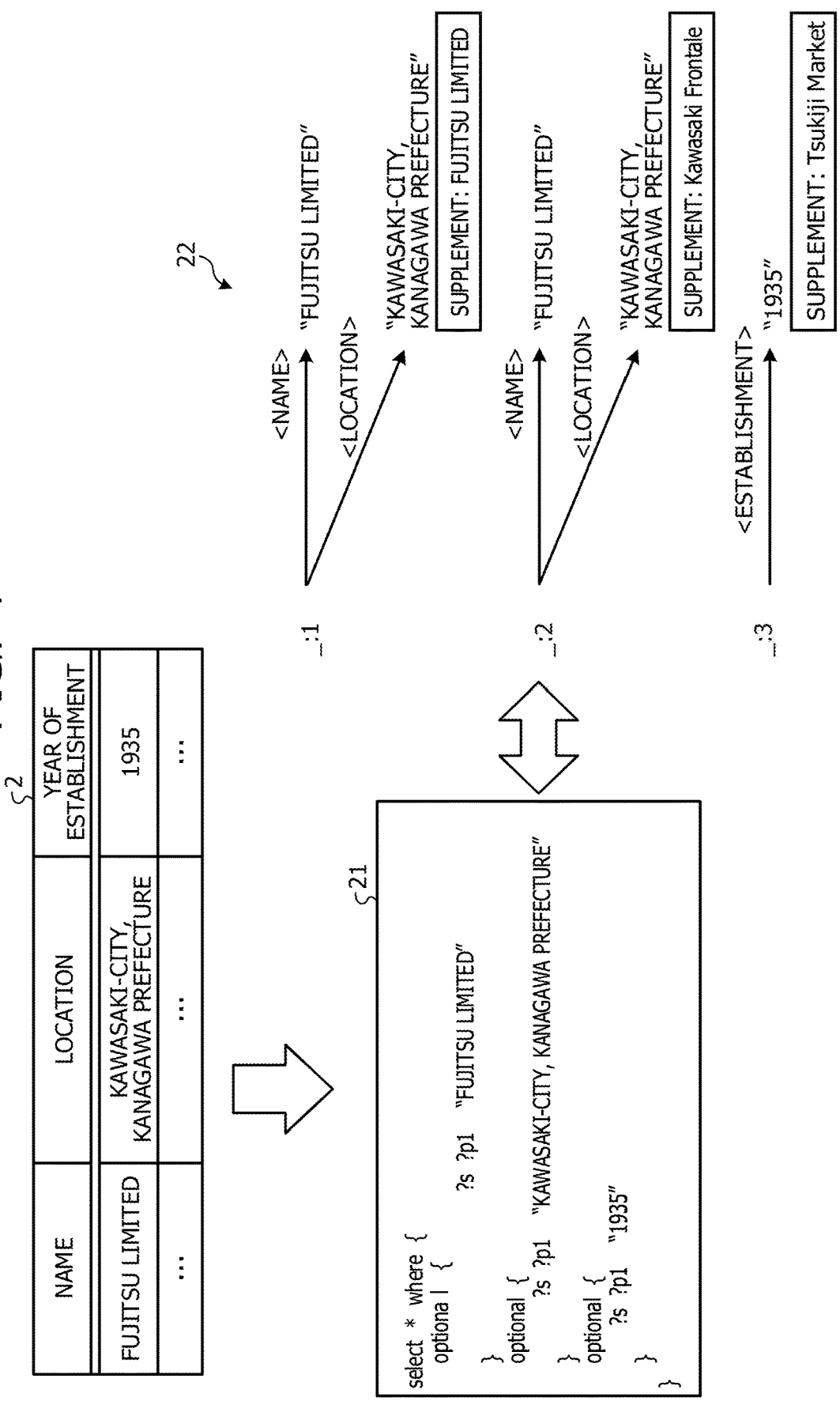
FIG. 4 is a diagram illustrating a collation process using table values.

Specifically, the first collation unit 13 creates a query for acquiring the subject and the predicate whose object is each acquired value. FIG. 4 is a diagram illustrating a collation process using table values. For example, a description will be given of a case having the table 2 illustrated in FIG. 4. In this case, the table 2 has values, FUJITSU LIMITED, Kawasaki-city, Kanagawa Prefecture and 1935. The first collation unit 13 creates a query 21 for acquiring the subject and the predicate whose object is FUJITSU LIMITED, Kawasaki-city, Kanagawa Prefecture, or 1935. "?S" in the query 21 represents any subject. Each of "?p1, ?p2, ?p3" represents any predicate. An optional phrase is used in the query 21 to ignore a case where the subject and the predicate whose object is a character string do not exist.

The first collation unit 13 outputs the created query to the SPARQL processing unit 12 and requests an acquisition of the subject and the predicate whose object is the word designated by the query. Thereafter, the first collation unit 13 receives, from the SPARQL processing unit 12, the input of the subject and the predicate whose object is the word designated by the query. Extraction by the first collation unit 13 of the subject and predicate whose object is the value of the table 2 corresponds to collation of the RDF data set 3 using the value of the table 2. The fact that the subject and the predicate corresponding to the values of the table 2 has been extracted is referred to as "collated". The object in the RDF data set collated with the value in the table 2 by this collation is an example of "collation node".

For example, the first collation unit 13 acquires RDF data 22 as a result of the acquisition request by the query 21 as illustrated in FIG. 4. For example, the first collation unit 13 acquires the subject "_: 1" whose predicates are the name and the location with respect to the objects, FUJITSU LIMITED and Kawasaki-city, Kanagawa Prefecture. In this case, "_: 1" is a URL representing FUJITSU LIMITED indicated by supplement of the RDF data 22. The first collation unit 13 acquires the subject "_: 2" whose predicate is the name and location with respect to the objects, FUJITSU LIMITED and Kawasaki-city, Kanagawa Prefecture. In this case, "_: 2" is a URL representing Kawasaki Frontale indicated by supplement of the RDF data 22. The first collation unit 13 acquires the subject "_: 3" whose predicate is the establishment with respect to the object, 1935. In this case, "_: 3" is a URL representing the Tsukiji Market indicated by supplement of the RDF data 22.

The first collation unit 13 stores the data representing the acquired subject and predicate in the data base (DB) 15 for intermediate data. The acquired subject corresponds to the "first node". The acquired predicate corresponds to an example of the "first edge". This first collation unit corresponds to an example of the "collation unit".

The additional information acquisition unit 14 acquires all the subjects stored in the intermediate data DB 15, and removes duplication. Next, the additional information acquisition unit 14 selects one from the subjects from which duplication has been removed. Next, the additional information acquisition unit 14 creates a query for acquiring the type of the selected subject. For example, the additional information acquisition unit 14 may create a query for acquiring, as the object, the type of the subject selected as the object by using the predicate for acquiring the type of the subject with the selected subject as the subject as it is.

The additional information acquisition unit 14 outputs the created query to the SPARQL processing unit 12 and requests an acquisition of the type of the selected subject. Thereafter, the additional information acquisition unit 14 receives, from the SPARQL processing unit 12, the input of the type of the selected subject. Next, the additional information acquisition unit 14 stores the acquired type of the subject in association with the selected subject in the intermediate data DB 15. The additional information acquisition unit 14 sequentially selects the subjects from which duplication has been removed one by one, and repeatedly performs an acquisition of the types and a storage of the types into the intermediate data DB 15 with respect to all the subjects from which duplication has been removed.

FIG. 5 is a diagram illustrating the acquisition result of the type of the subject. For example, the additional information acquisition unit 14 acquires a type 31 and a type 32 as the type of the subject "_: 1". The type 31 is a URL representing an organization, and the type 32 is a URL representing a company. The additional information acquisition unit 14 stores the type 31 and the type 32 as the type of "_: 1" in the intermediate data DB 15. The additional information acquisition unit 14 acquires a type 33 as the type of the subject "_: 2". The type 33 is a URL representing an organization. The additional information acquisition unit 14 stores a type 332 as the type of "_: 2" in the intermediate data DB 15. The additional information acquisition unit 14 acquires a type 34 as the type of the subject "_: 3". The type 34 is a URL representing a market. The additional information acquisition unit 14 stores the type 33 as the type of "_: 3" in the intermediate data DB 15. The type of the subject is an example of the "second node".

Next, the additional information acquisition unit 14 acquires all the predicates stored in the intermediate data DB 15, and removes duplication. Next, the additional information acquisition unit 14 selects one from the predicates from which duplication has been removed. Next, the additional information acquisition unit 14 creates a query for acquiring the domain of the selected predicate. For example, the additional information acquisition unit 14 may create a query for acquiring, as the object, the domain of the predicate selected as the object with the selected predicate as the subject and the command, rdfs: domain, as the predicate.

The additional information acquisition unit 14 outputs the created query to the SPARQL processing unit 12 and requests an acquisition of the domain of the selected predicate. Thereafter, the additional information acquisition unit 14 receives, from the SPARQL processing unit 12, the input of the domain of the selected predicate. Next, the additional information acquisition unit 14 stores the acquired domain of the predicate in association with the selected predicate in the intermediate data DB 15. The additional information acquisition unit 14 sequentially selects the predicates from which duplication has been removed one by one, and repeatedly performs an acquisition of the domains and a storage of the domains into the intermediate data DB 15 with respect to all the subjects from which duplication has been removed.

Figure 6:
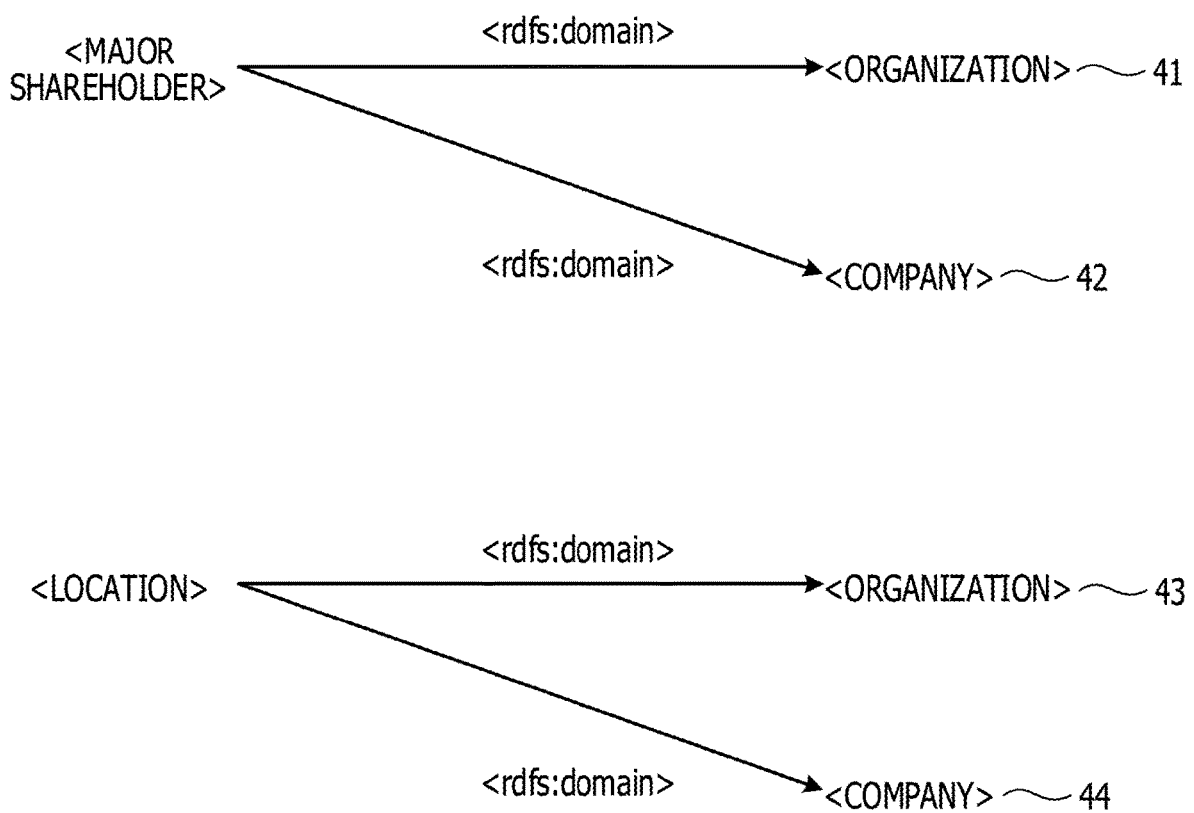
FIG. 6 is a diagram illustrating the acquisition result of the domain of a predicate.

FIG. 6 is a diagram illustrating the acquisition result of the domain of a predicate. For example, the additional information acquisition unit 14 acquires a domain 41 and a domain 42 as the domains of the major shareholder that is the predicate. The domain 41 is a URL representing an organization, and the domain 42 is a URL representing a company. The additional information acquisition unit 14 stores the domain 41 and the domain 42 as the domains of the major shareholder in the intermediate data DB 15. The additional information acquisition unit 14 acquires the domain 43 and the domain 44 as the domains of the location which is the predicate. The domain 43 is a URL representing an organization, and the domain 44 is a URL representing a company. The additional information acquisition unit 14 stores the domain 43 and the domain 44 as the domains of the location in the intermediate data DB 15. The domain of the predicate is an example of the "third node". The additional information acquisition unit 14 corresponds to an example of the "identification unit".

The intermediate data DB 15 is a database for storing intermediate data for the process of associating the table 2 with the RDF data. The intermediate data DB 15 may be created in advance and stored in the information processing device 1 or may be created by the information processing device 1 at the start of the process of associating the table 2 with the RDF data. The intermediate data DB 15 stores the subject and predicate whose object is each value of the table 2 acquired by the first collation unit 13, and the type of each subject and the domain of each predicate.

The score calculation unit 16 acquires the type used as the type of the subject stored in the intermediate data DB 15 after excluding duplication. In the following, the type acquired in this process is called the "constraint type". The score calculation unit 16 calculates the score of each constraint type. This score is a value indicating how highly probable each constraint type may be as candidate in collation. The calculation of the score of each constraint type by the score calculation unit 16 will be described in detail below.

First, the score calculation unit 16 acquires the number of columns and the number of rows of the table 2. The score calculation unit 16 refers to the RDF store stored in the RDF data storage unit 11 and calculates the number of different subjects representing the number of different subjects included in all the RDF data. The score calculation unit 16 acquires the number of different subjects having each constraint type in all the RDF data included in the RDF store. The score calculation unit 16 calculates the maximum number of columns that may be collated under the constraint under which the type of the subject is each constraint type in the table 2.

The score calculation unit 16 calculates the score of each constraint type using the following Expression (1). Here, the constraint type selected from the constraint types is represented as the type t.

$$U_t = \frac{N}{n_t} \times \frac{1}{R}\sum_{r=1}^{R}\frac{c_{t,r}}{C} \approx \frac{1}{n_t}\sum_{r=1}^{R} c_{t,r} \qquad (1)$$

where $U_t$ is the score of the type t, C is the number of columns in the table 2, R is the number of rows of the table 2, N is the number of different subjects in all the RDF data included in the RDF store, $n_t$ is the number of different subjects having the type t as a type in all the RDF data included in the RDF store, and $c_{t,r}$ is the maximum number of columns that has been collated under the constraint under which the subject is the type t.

In Expression (1), $N/n_t$ is used to reduce the score, as regarded the frequently appearing type as an abstract type. $c_{t,r}/C$ is used to increase the score of a type that satisfies more columns.

Next, the score calculation unit 16 acquires, from the intermediate data DB 15, all the predicates after excluding duplication. The score calculation unit 16 acquires the domain of each predicate from the intermediate data DB 15.

The score calculation unit 16 calculates the score of the predicate corresponding to each column by the following Expression (2) using the calculated score of each constraint type. The score of the predicate represents the probability of associating a specific predicate with a certain column.

$$S_{p,c} = \frac{1}{T}\frac{1}{R}\sum_{r=1}^{R}\sum_{t=1}^{T} U_t f_{t,p,c,r} = \sum_{r=1}^{R}\sum_{t=1}^{T} U_t f_{t,p,c,r} \quad (2)$$

where T is the number of kinds of constraint types, $S_{p,c}$ is the score of the column c for the predicate p, and $f_{t,p,c,r}$ is a function satisfying the following conditions. For example, in a case where the subject of the type t and the predicate p corresponding to the column c of the row r exist, and the type t of the subject satisfies the constraint of the domain of the predicate p, $f_{t,p,c,r}$ is 1. In a case where the subject of the type t and the predicate p corresponding to the column c of the row r exist, but the type t of the subject does not satisfy the constraint of the domain of the predicate p, $f_{t,p,c,r}$ is 0.5. In a case where the subject of the type t and the predicate p corresponding to the column c of the row r do not exist, but the subject of the type t corresponding to the row r exist, and the type t of the subject does not satisfy the constraint of the domain of the predicate p, $f_{t,p,c,r}$ is 0.5. $f_{t,p,c,r}$ is 0 in cases other than the upper limit above. $f_{t,p,c,r}$ represents how closely a specific predicate satisfies the constraint of domain.

Thereafter, the score calculation unit 16 outputs the calculated score of the predicate corresponding to each column to the second collation unit 17. The score of the predicate calculated by the score calculation unit 16 corresponds to the "correlation strength".

The second collation unit 17 receives the input of the score of the predicate corresponding to each column of the table 2 from the score calculation unit 16. The second collation unit 17 selects one column from the columns of the table 2. Next, the second collation unit 17 identifies the predicate with the highest score and the predicate with the second highest score in the column of the item. The predicate with the highest score and the predicate with the second highest score are the first candidates for the predicate representing the column. The second collation unit 17 creates a query for acquiring the subject whose predicate is the predicate with the highest score and whose object is each value in the selected column. Next, the second collation unit 17 outputs the created query to the SPARQL processing unit 12 and requests an acquisition of the subject. Thereafter, the second collation unit 17 receives, from the SPARQL processing unit 12, the input of the subject whose predicate is the predicate with the highest score and whose object is each value in the selected column. Similarly, the second collation unit 17 acquires, from the SPARQL processing unit 12, the subject whose predicate is the predicate with the second highest score and whose object is each value in the selected column.

Extraction by the second collation unit 17 of the subject corresponding to the object and the predicate corresponds to collation by the value of the table 2 and the selected object. The fact that the subject corresponding to the object and predicate used for the collation has been extracted is referred to as "collated".

In a case where the result of collation with the predicate with the highest score has higher collation frequency than the result of collation with the predicate with the second highest score, the second collation unit 17 determines that the predicate with the highest score represents the selected column. In this case, the second collation unit 17 stores the determined result in the temporary storage unit 18.

On the other hand, in a case where the result of collation with the predicate with the highest score has lower collation frequency than the result of collation with the predicate with the second highest score, the second collation unit 17 performs collation on the column selected by using the predicate with the third highest score. In a case where the result of collation with the predicate with the second highest score has higher collation frequency than the result of collation with the predicate with the third highest score, the second collation unit 17 determines that the second highest predicate represents the selected column. In this way, the second collation unit 17 repeats the collation and comparison process until the result of collation with the predicate with a specific score has higher collation frequency than the result of collation with the predicate with the highest score following the specific score.

The second collation unit 17 repeats storage of the determination result of the predicate corresponding to each column into the temporary storage unit 18. The second collation unit 17 finally stores the determination result of the corresponding predicate for all the columns in the temporary storage unit 18. Each column of the table 2 corresponds to an example of "item". Identification of the corresponding predicate for each column is an example of "identification of the first edge corresponding to each item".

Next, using the information of the predicate corresponding to each column stored in the temporary storage unit 18, the second collation unit 17 creates, for each column, a query for acquiring the subject whose object is each value in each column and whose predicate is the predicate corresponding to each column. Thereafter, the second collation unit 17 outputs the created query to the SPARQL processing unit 12. As a result, the second collation unit 17 requests, for each row, an acquisition of the common subject for each column whose object is each value in each column and whose predicate is predicate corresponding to each column. Thereafter, the second collation unit 17 acquires, for each row, from the SPARQL processing unit 12, the subject common to each column corresponding to each value in each column. The acquisition of this subject is an example of "extraction of the first node sharing the first edge identified for each item between the collation nodes and common to each item.

The second collation unit 17 outputs, to the result management unit 19, the information of the subject common to each column corresponding to each value in each column and the information of the predicate corresponding to each column stored in the temporary storage unit 18. The subject common to each column corresponding to each value in each column for each row may be regarded as related information of each row.

The second collation unit 17 is an example of the "identification unit". Each row of the table 2 is an example of "row data". The association between each row of the table 2 and the related information which is RDF data corresponds to an example of "association between each extracted first node and each row data" and "association between reference source data and reference destination data".

Figure 7:
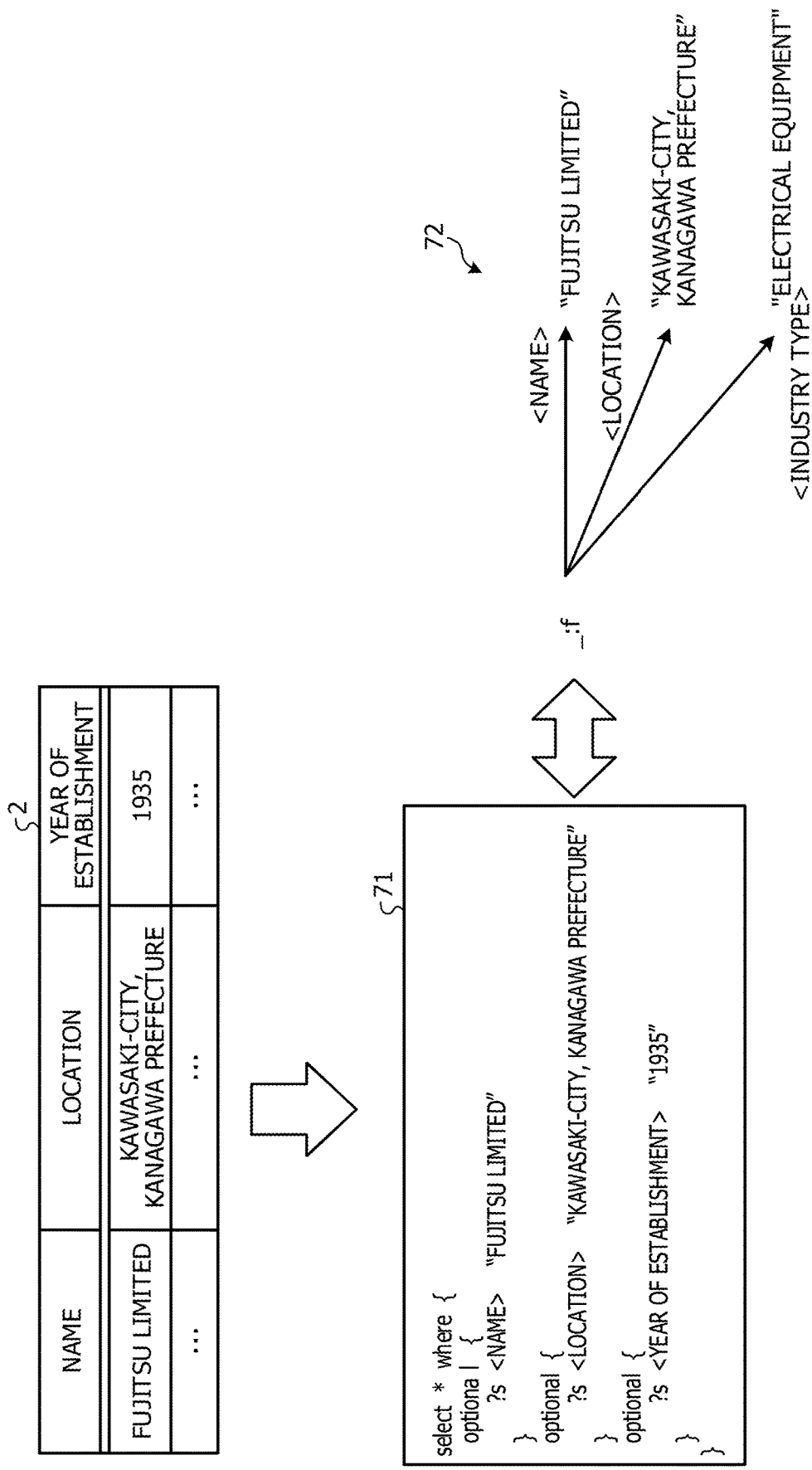
FIG. 7 is a diagram illustrating a process of extracting a subject related to each row.

FIG. 7 is a diagram illustrating a process of extracting a subject related to each row. Here, the case where the second collation unit 17 has determined that the predicate representing the first row of the table 2 is <name>, the predicate representing the second row is <location>, and the predicate representing the third row is <year of establishment> will be described. For the first row of the table 2, the second collation unit 17 creates a query 71 for acquiring the subject common to each row whose predicate is <name> and whose object is FUJITSU LIMITED in the first column, whose predicate is <Location> and whose object is Kawasaki-city, Kanagawa Prefecture in the second column, and whose predicate is <year of establishment> and whose object is 1935 in the third column. In this case, the optional phrase is used in the query 71 in order to ignore the case where the subject having these as the object and the predicate does not exist. The second collation unit 17 requests the SPARQL processing unit 12 to acquire the subject using the created query 71. As a result, as illustrated by RDF data 72, the second collation unit 17 extracts "_: F" as the subject whose object is FUJITSU LIMITED when <name> is the predicate, and whose object is Kawasaki-city, Kanagawa Prefecture when <Location> is the predicate. In the RDF data 72, although "_: f" has the predicate which is <industry type> and has the object which is Electrical Equipment, the information, which exists in the RDF data set 3, is not the target of collation.

The result management unit 19 receives, from the second collation unit 17, the input of information of the subject corresponding to each value in each column and information of the predicate corresponding to each column stored in the temporary storage unit 18. The result management unit 19 stores, as the related information of each row and each column of the table 2, information of the subject corresponding to each value in each column and information of the predicate corresponding to each column stored in the temporary storage unit 18. With this related information, the data of the table 2 and the data of RDF data set 3 are joined. For example, when retrieving a row of the table 2, the related information corresponding to the row and the value of the RDF data set 3 associated with the related information are acquired. In this way, by associating each row of the table 2 with the related information that is the RDF data by the information processing device 1, an appropriate triple corresponding to the table data value may be reliably detected from the RDF data. For example, it is possible to effectively utilize the information of the RDF data set which is not in the table information by using this association.

The result management unit 19 may output the stored information to another device that performs processing using the table 2 and the another device may perform processing using this related information. The result management unit 19 may cause an output device such as a monitor to output the related information and notify the user of the related information.

Figure 8:
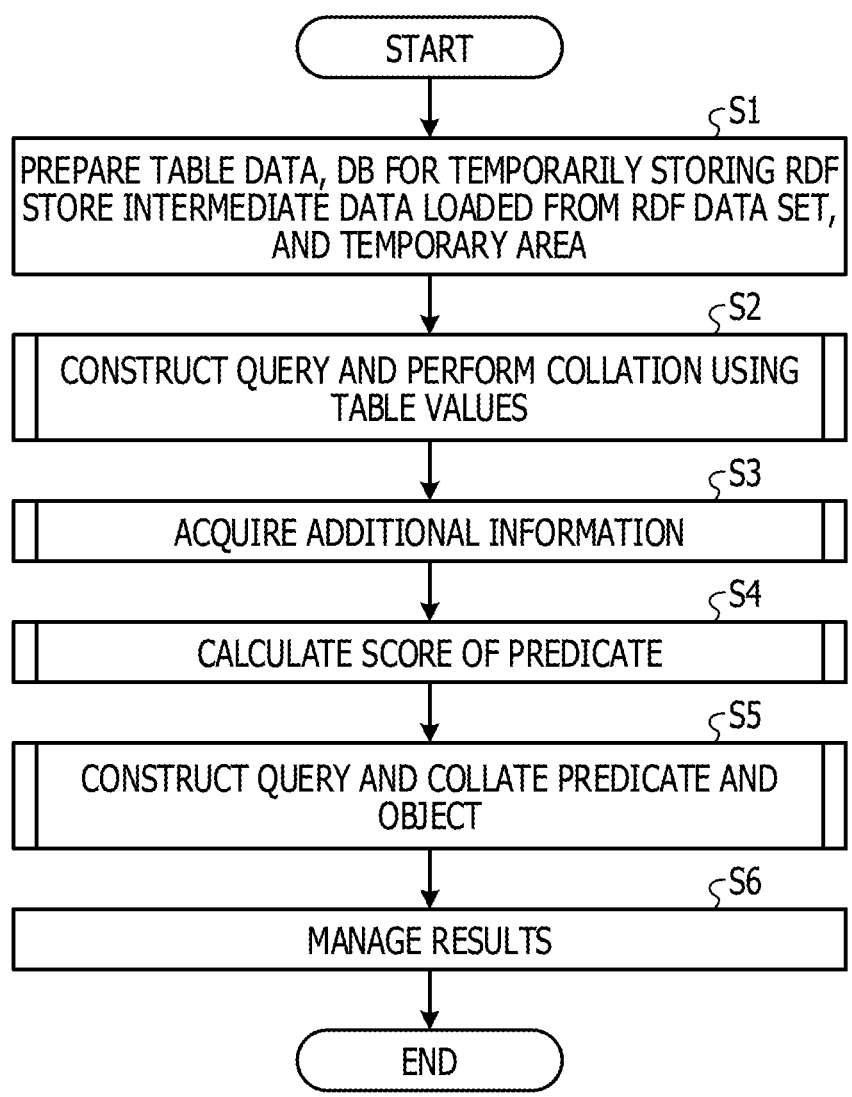
FIG. 8 is a flowchart of an entire join process of data.

Next, with reference to FIG. 8, a flow of the overall data join process by the information processing device 1 will be described. FIG. 8 is a flowchart of an entire join process of data.

The administrator of the information processing device 1 prepares the table 2, the intermediate data DB 15 which is a DB for holding intermediate data, and the temporary storage unit 18 which is a temporary area for storing the collation result. The administrator loads RDF data from the RDF data set 3 using an input device (not illustrated) and stores the RDF data in the RDF data storage unit 11 of the information processing device 1, thereby preparing the RDF store (step S1).

Next, the first collation unit 13 constructs a query for acquiring the subject and the predicate whose object is the value of the table 2, and collates the RDF data using the value of the table 2 (step S2).

Next, the additional information acquisition unit 14 acquires the type of the subject and the domain of the predicate as additional information (step S3).

Next, the score calculation unit 16 calculates the score of the predicate for each column (step S4).

Next, the second collation unit 17 selects the predicate according to the score for each column, constructs a query for acquiring the subject whose object is the value in each column of the table 2 according to the selected predicate, collates the predicate and the object, and extracts the related information of each row and each column using the collation result (step S5).

Thereafter, the result management unit 19 stores the related information of each row and each column extracted by the second collation unit 17, transmits the information to other devices, and makes a notification to the user (step S6).

Figure 9:
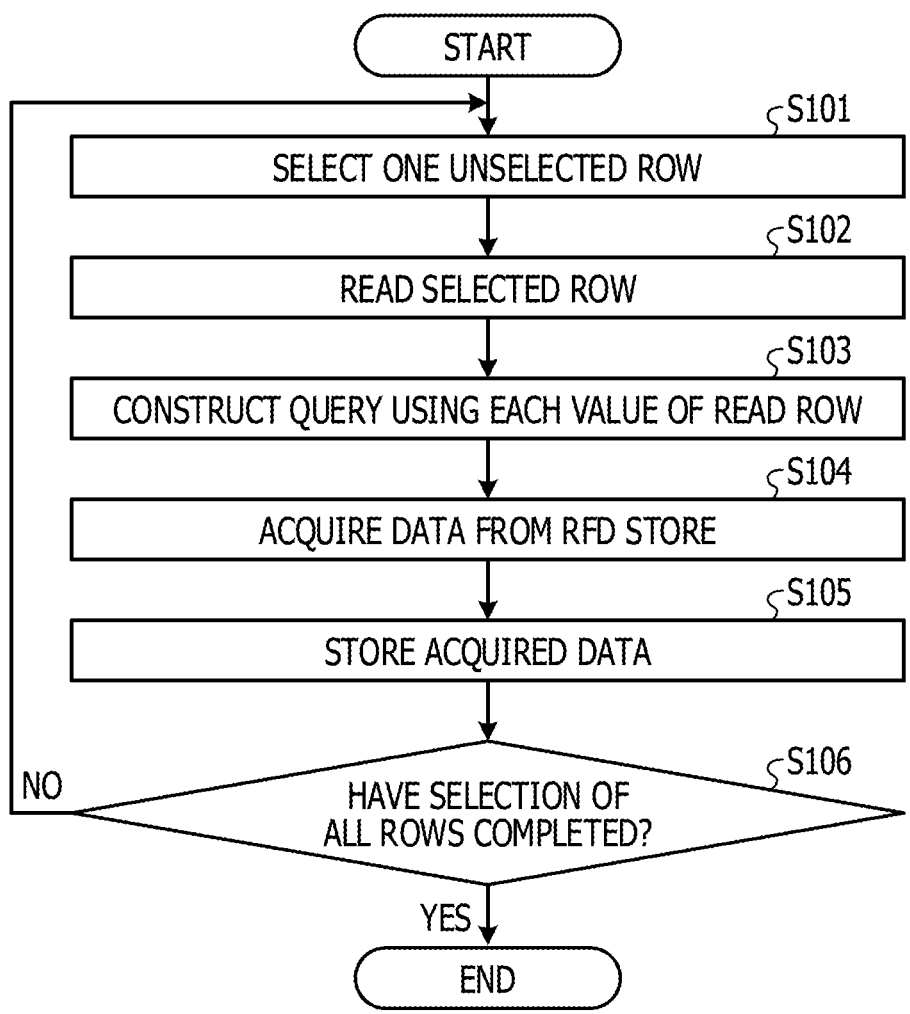
FIG. 9 is a flowchart of the construction of a query and the collation process using the table values.

Next, referring to FIGS. 9 and 10, the flow of the construction of the query by the first collation unit 13 and the collation process using the value of the table 2 will be described. FIG. 9 is a flowchart of the construction of a query and the collation process using the table values. The process illustrated in FIG. 9 corresponds to an example of the process performed in step S2 in FIG. 8. FIG. 10 is a diagram illustrating an example of the query constructed by a first collation unit and collation results. Here, the case will be described where the first collation unit 13 performs collation using the table 2 and the RDF data 23 illustrated in FIG. 10.

The first collation unit 13 selects one unselected row in the table 2 (step S101).

Next, the first collation unit 13 reads each value of the selected row (step S102).

Next, using each value of the read row, the first collation unit 13 constructs a query for acquiring the subject and the predicate whose object is each value (step S103). For example, the first collation unit 13 constructs a query 24 for acquiring the subject and the predicate whose object is each value in the first row of the table 2 illustrated in FIG. 10. The query 24 is a query for acquiring the subject and the predicate whose objects are company A, city A and 1935. An optional phrase is used in the query 24 to ignore a case where the subject and the predicate whose object is a character string do not exist.

Next, the first collation unit 13 outputs the constructed query to the SPARQL processing unit 12. Thereafter, the first collation unit 13 acquires data from the RDF store stored in the RDF data storage unit 11 via the SPARQL processing unit 12 (step S104). For example, the first collation unit 13 acquires data 25 of FIG. 10 as a response of the query 24. For example, the first collation unit 13 acquires "_: a" and "name" as the subject and the predicate whose object is company A. Besides, the first collation unit 13 acquires "_: a1" and <major shareholder> as the subject and the predicate whose object is company A. The first collation unit 13 acquires "_: a" and <location> as the subject and the predicate whose object is city A. The first collation unit 13 acquires "_: a2" and <establishment> as the subject and the predicate whose object is 1935.

Next, the first collation unit 13 stores the acquired data in the intermediate data DB 15 (step S105). For example, the first collation unit 13 stores the data 25 in the intermediate data DB 15.

Thereafter, the first collation unit 13 determines whether selection of all the rows in the table 2 has been completed (step S106). When unselected rows remain (step S106: "NO"), the first collation unit 13 causes the process to return to step S101.

On the other hand, when selection of all the rows has been completed (step S106: "YES"), the first collation unit 13 ends the collation process.

Figure 11:
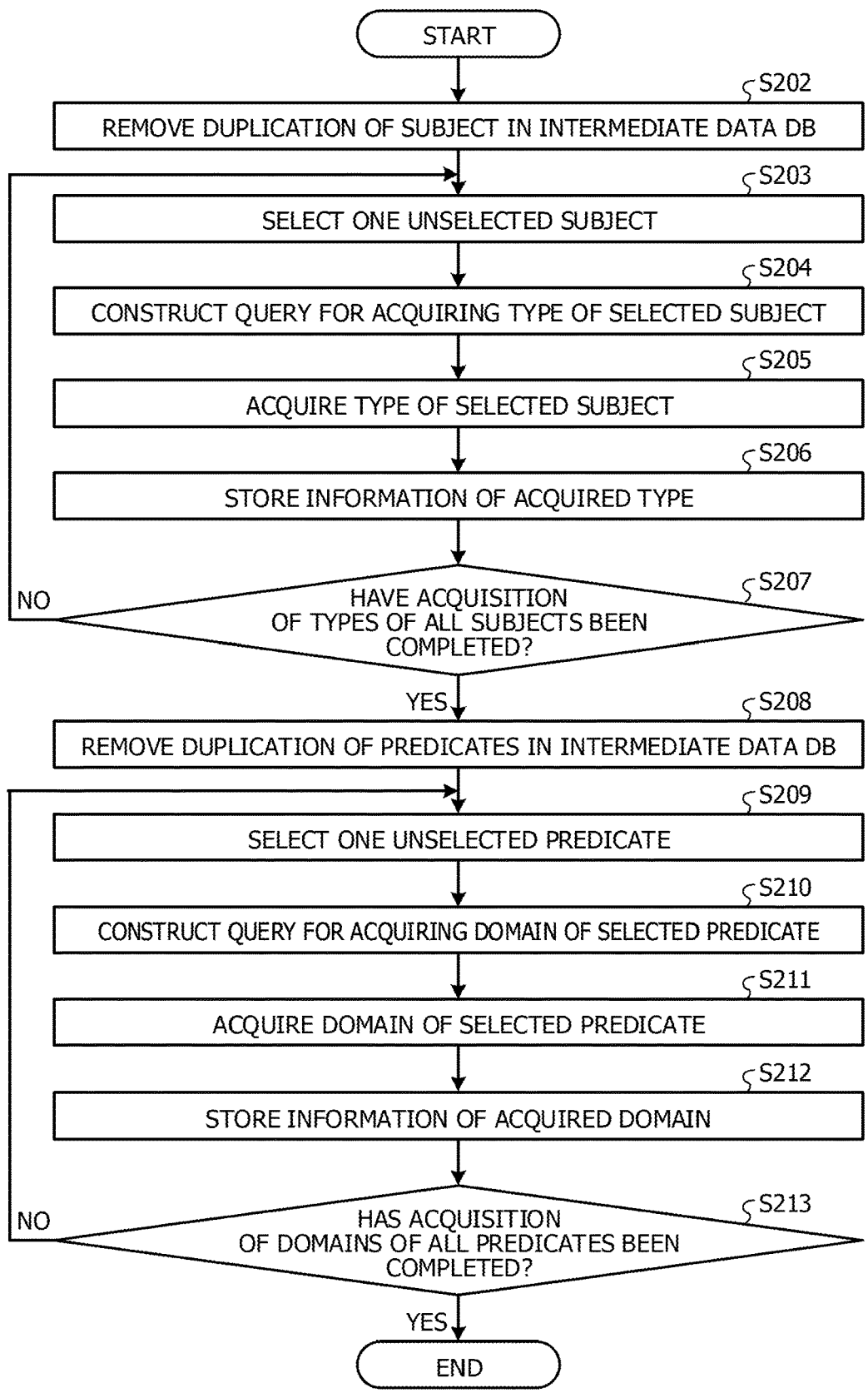
FIG. 11 is a flowchart of an acquisition process of additional information.

Next, with reference to FIGS. 11 and 12, the flow of acquisition processing of additional information by the additional information acquisition unit 14 will be described. FIG. 11 is a flowchart of an acquisition process of additional information. FIG. 11 corresponds to an example of the process performed in step S3 in FIG. 8. FIG. 12 is a diagram illustrating the query for obtaining additional information and the acquisition result of additional information. A case where the data 25 illustrated in FIG. 12 is stored in the intermediate data DB 15 will be described.

The additional information acquisition unit 14 removes duplication of the subject in the intermediate data DB 15 (step S202). For example, in the data 25 of FIG. 12, in the additional information acquisition unit 14, the subject of the first row and the subject of the second row are duplicate as "_: a". Therefore, the additional information acquisition unit 14 leaves one "_: a" as the subject. For example, the subjects are three "_: a", "_: a1" and "_: a2".

Next, the additional information acquisition unit 14 selects one unselected subject from the subjects from which duplication is removed (step S203).

Next, the additional information acquisition unit 14 constructs a query for acquiring the type of the selected subject (step S204). For example, the additional information acquisition unit 14 constructs a query 35 in FIG. 12. The query 35 is a query for acquiring the type of the subject "_: a". The predicate a in the query 35 is a predicate for acquiring the type.

Next, the additional information acquisition unit 14 outputs the constructed query to the SPARQL processing unit 12, and acquires the type of the selected subject from the SPARQL processing unit 12 (step S205). For example, the additional information acquisition unit 14 acquires, as the type of each subject of the data 25, the objects of the third to seventh rows of data 50 as the type of each subject. Here, the row in which the value is first stored in the data 50 is set to 0 row. The additional information acquisition unit 14 may acquire a plurality of types for one subject.

Next, the additional information acquisition unit 14 stores the information of the acquired type information in the intermediate data DB 15 (step S206).

Thereafter, the additional information acquisition unit 14 determines whether the acquisition of the types of all the subjects stored in the intermediate data DB 15 has been completed (step S207). When the subject whose type has not been acquired still remains (step S207: "NO"), the additional information acquisition unit 14 causes the process to return to step S203.

On the other hand, in a case where the acquisition of the types of all the subjects has been completed (step S207: "YES"), the additional information acquisition unit 14 removes duplication of the predicates in the intermediate data DB 15 (step S208). For example, in the data 25 of FIG. 12, the additional information acquisition unit 14 has no duplication of predicates. Therefore, the additional information acquisition unit 14 acquires four of <name>, <location>, <major shareholder>, and <establishment> as the predicates from which duplication is removed.

Next, the additional information acquisition unit 14 selects one unselected predicate from the predicates from which duplication is removed (step S209).

Next, the additional information acquisition unit 14 constructs a query for acquiring the domain of the selected predicate (step S210). For example, the additional information acquisition unit 14 constructs a query 45 in FIG. 12. The query 45 is a query for acquiring the domain of the predicate <location>. rdfs: domain is a predicate for acquiring the domain of the subject.

Next, the additional information acquisition unit 14 outputs the constructed query to the SPARQL processing unit 12, and acquires the domain of the selected predicate from the SPARQL processing unit 12 (step S211). For example, the additional information acquisition unit 14, as the domain of each predicate, acquires the objects of the 8th to 12th rows of the data 50 as the type of each subject of the data 25. The additional information acquisition unit 14 may acquire a plurality of domains for one predicate.

Next, the additional information acquisition unit 14 stores the information of the acquired domain in the intermediate data DB 15 (step S212).

Thereafter, the additional information acquisition unit 14 determines whether the acquisition of the domains of all the predicates stored in the intermediate data DB 15 has been completed (step S213). When the predicate whose domain has not been acquired still remains (step S213: "NO"), the additional information acquisition unit 14 causes the process to return to step S209.

On the other hand, in a case where the acquisition of the domains of all the predicates has been completed (step S213: "YES"), the additional information acquisition unit 14 ends the acquisition process of the additional information. In this case, the data 50 is stored in the intermediate data DB 15. In the data 50, the relationship between the subject and the type and the relationship between the predicate and the domain are stored in the form of triple, but the storage method is not limited thereto.

Figure 13:
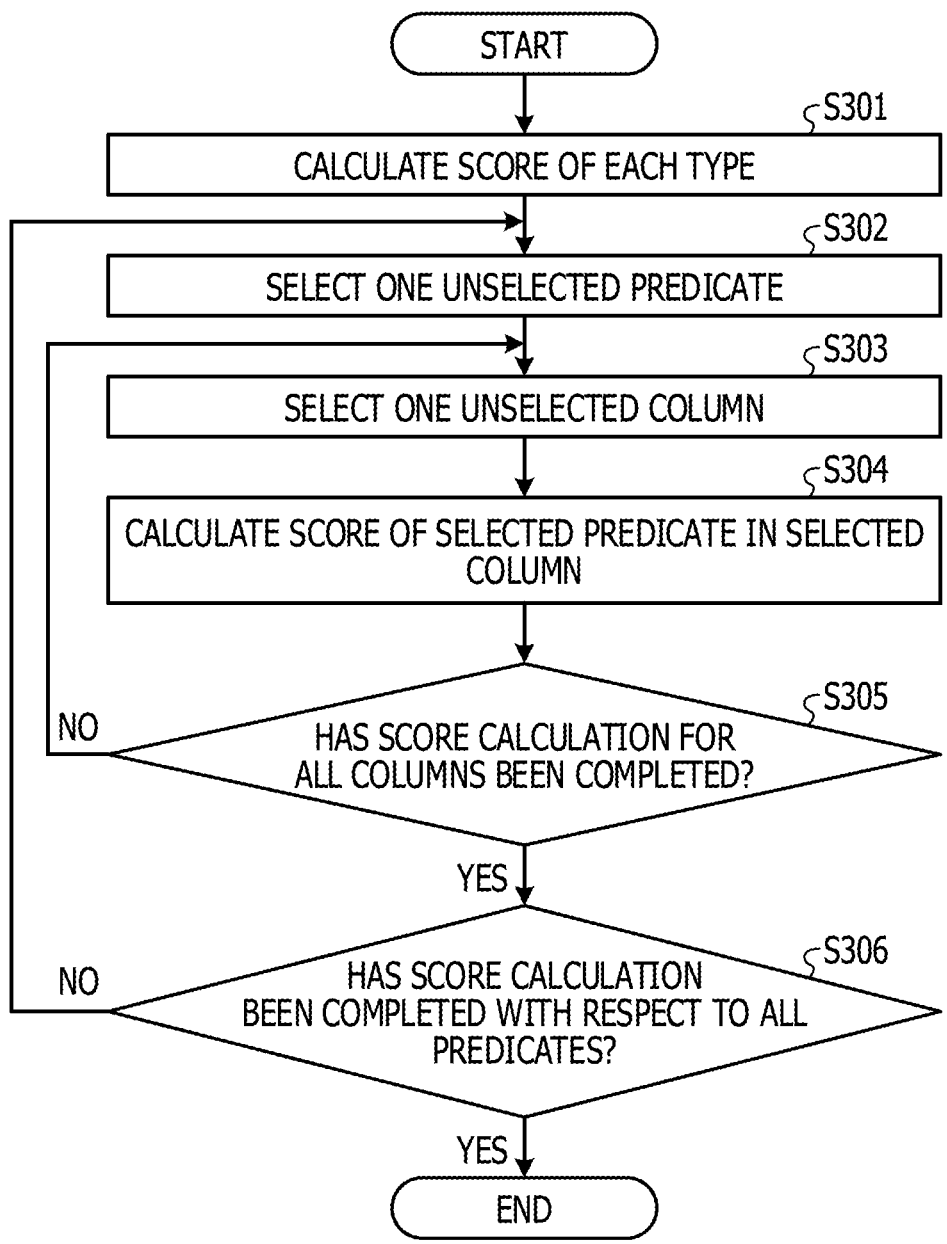
FIG. 13 is a flowchart of a predicate score calculation process.

Next, with reference to FIGS. 13 and 14, the flow of the predicate score calculation processing by the score calculation unit 16 will be described. FIG. 13 is a flowchart of a predicate score calculation process. FIG. 13 corresponds to an example of the process performed in step S4 in FIG. 8. FIG. 14 is a diagram illustrating an example of the calculation result of the predicate score.

The score calculation unit 16 calculates the score of each type using Expression (1) (step S301).

Next, the score calculation unit 16 selects one unselected predicate from the intermediate data DB 15 (step S302).

Next, the score calculation unit 16 selects one unselected column from the table 2 (step S303).

Next, the score calculation unit 16 calculates the score of the selected predicate in the selected column using the score of each type calculated by Expression (2) (step S304).

Next, the score calculation unit 16 determines whether calculation of the score for all the columns with respect to the selected predicate has been completed (step S305). When a column for which no score has been calculated remains (step S305: "NO"), the score calculation unit 16 causes the process to return to step S303.

On the other hand, when the calculation of the scores for all the columns has been completed (step S305: "YES"), the score calculation unit 16 determines whether the calculation of the scores has been completed with respect to all the predicates stored in the intermediate data DB 15 (step S306).

In a case where a predicate whose score has been calculated remains (step S306: "NO"), the score calculation unit 16 causes the process to return to step S302. On the other hand, when the calculation of the scores of all the predicates has been completed (step S306: "YES"), the score calculation unit 16 ends the score calculation process.

The score calculation unit 16 acquires the score for each column with respect to each predicate described in the score table 60 illustrated in FIG. 14, for example. For example, the score calculation unit 16 calculates the score of the predicate, "name", in the 0th column of the table 2 as 0.3. The score calculation unit 16 calculates the score of the predicate, "name", in the first column of the table 2 as 0.2. The score calculation unit 16 calculates the score of the predicate, "name", in the second column of the table 2 as 0.1. Similarly, the score calculation unit 16 calculates the score of the predicate, "location", in the 0th column of the table 2 as 0.2. The score calculation unit 16 calculates the score of the predicate, "location", in the first column of the table 2 as 0.3. The score calculation unit 16 calculates the score of the predicate, "location", in the second column of the table 2 as 0.1.

Figure 15A:
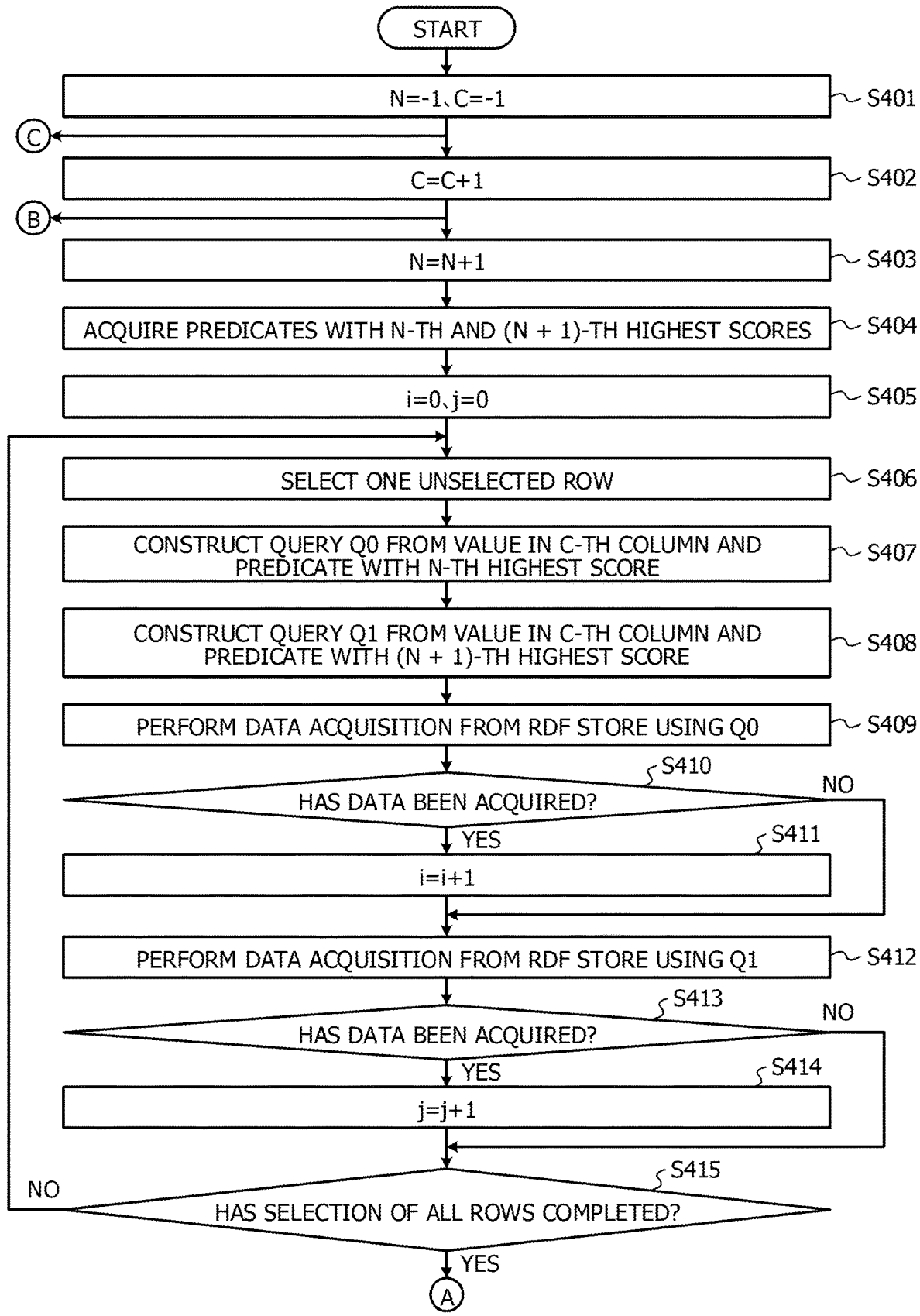
FIGS. 15A and 15B are a flow chart of construction of a query and a collation process of a predicate and an object.
Figure 15B:
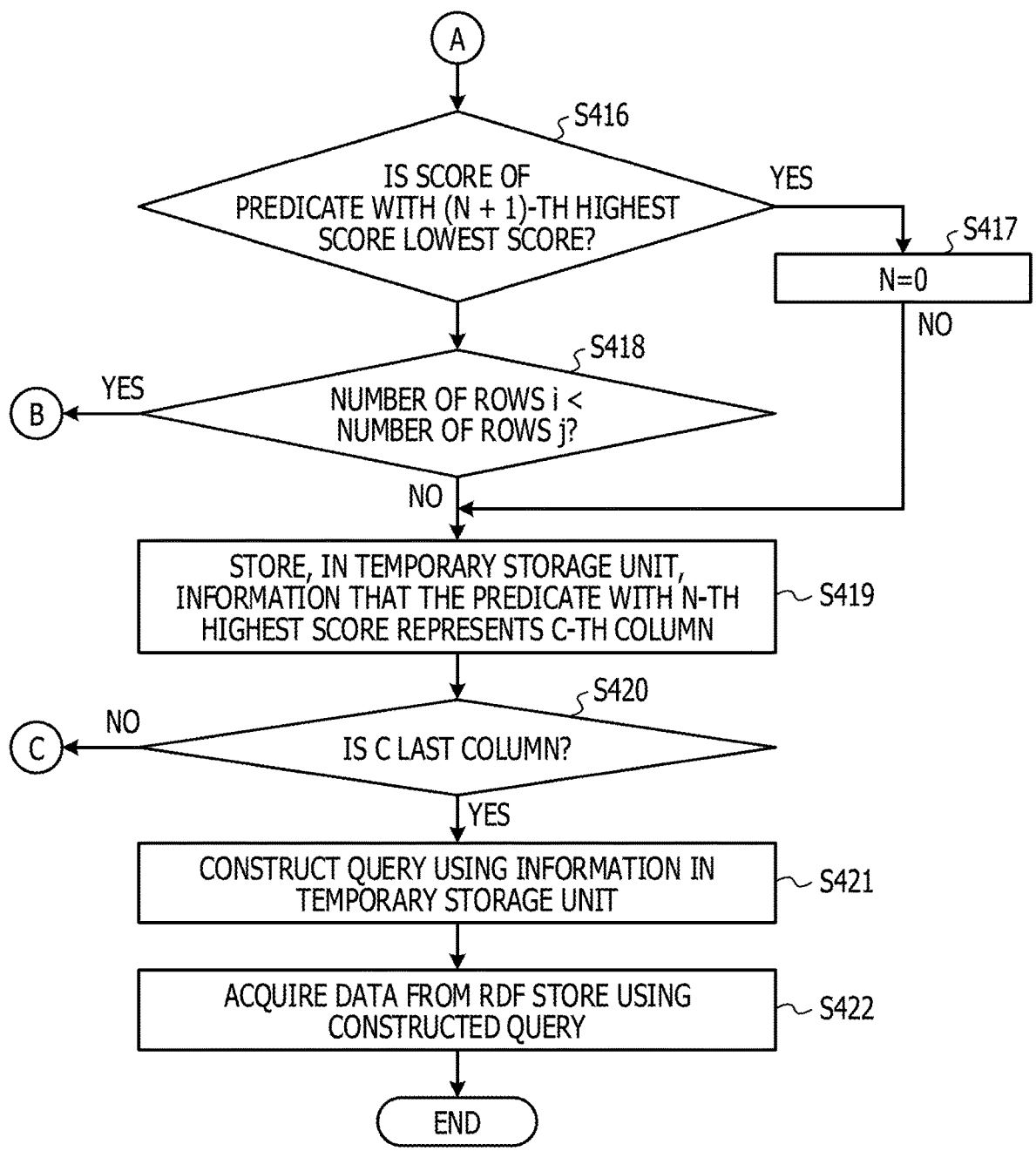

Next, referring to FIGS. 15A and 15B, the flow of the construction of the query and the collation process of the predicate and the object by the second collation unit 17 will be described. FIG. 15 (i.e. FIGS. 15A and 15B) is a flow chart of construction of the query and the collation process of the predicate and the object. FIG. 15 corresponds to an example of the process performed in step S5 in FIG. 8.

The second collation unit 17 sets N representing the predicate number to −1 and C representing the column number to −1 (step S401).

Next, the second collation unit 17 increments C by 1 (step S402).

Next, the second collation unit 17 increments N by 1 (step S403).

Next, the second collation unit 17 acquires the predicate with the N-th highest score and the predicate with the (N+1)-th highest score (step S404).

Next, the second collation unit 17 sets, to 0, i representing the number of rows for which the predicate with the N-th highest score may be collated. The second collation unit 17 sets, to 0, j representing the number of rows for which the predicate with the (N+1)-th highest score may be collated (step S405).

Next, the second collation unit 17 selects one unselected row from the rows of the table 2 (step S406).

Next, the second collation unit 17 constructs the query Q0 from the value of the C-th column and the predicate with the N-th highest score (step S407).

Next, the second collation unit 17 constructs the query Q1 from the value of the C-th column and the predicate with the (N+1)-th highest score (step S408).

Next, the second collation unit 17 performs an acquisition of data from the RDF store using the Q0 (step S409). In this case, the second collation unit 17 acquires the subject whose object is the value of the C-th column when using the predicate with the N-th highest score.

The second collation unit 17 determines whether the data has been acquired (step S410). When the data is not acquired (step S410: "NO"), the second collation unit 17 causes the process to proceed to step S412.

On the other hand, when the data has been acquired (step S410: "YES"), the second collation unit 17 increments i by 1 (step S411).

Next, the second collation unit 17 performs an acquisition of the data from the RDF store using the Q1 (step S412). In this case, the second collation unit 17 acquires the subject whose object is the value of the C-th column when using the predicate with the (N+1)-th highest score.

The second collation unit 17 determines whether the data has been acquired (step S413). In a case where the data is not acquired (step S413: "NO"), the second collation unit 17 causes the process to proceed to step S415.

On the other hand, when the data has been acquired (step S413: "YES"), the second collation unit 17 increments j by 1 (step S414).

Thereafter, the second collation unit 17 determines whether selection of all the rows of the table 2 has been completed (step S415). In a case where a row that has not yet been selected remains in the rows of the table 2 (step S415: "NO"), the second collation unit 17 causes the process to return to step S406.

On the other hand, when selection of all the rows of the table 2 has been completed ("YES" at step S415), the second collation unit 17 determines whether the score of the predicate with the (N+1)-th highest score is the lowest score (step S416). In a case where the score of the predicate with the (N+1)-th highest score of is the lowest score (step S416: "YES"), the second collation unit 17 sets N to 0 (step S147).

On the other hand, in a case where the score of the predicate with the (N+1)-th highest score is not the lowest score (step S416: "NO"), the second collation unit 17 determines whether the number of rows i is less than the number of rows j (step S418). When the number of rows i is less than the number of rows j (step S418: "YES"), the second collation unit 17 causes the process to return to step S403.

On the other hand, when the number of rows i is equal to or larger than the number of rows j (step S418: "NO"), the second collation unit 17 stores, in the temporary storage unit 18, the information that the predicate with the N-th highest score represents the C-th column in the table 2 (step S419).

The second collation unit 17 determines whether C is the last column in the table 2, that is, whether all the columns have been selected (step S420). In a case where C is not the last column (step S420: "NO"), the second collation unit 17 causes the process to return to step S402.

On the other hand, in a case where C is the last column (step S420: "YES"), the second collation unit 17 constructs a query using the information of the predicate corresponding to each column in the table 2 stored in the temporary storage unit 18 (step S421). For example, the second collation unit 17 constructs, for each row, a query for extracting the subject common to all the columns whose object is the value in each column when using the predicate corresponding to each column.

The second collation unit 17 acquires the data from the RDF store using the constructed query (step S422). For example the second collation unit 17 acquires, for each row, the information of the subject common to all the columns whose object is the value in each column when using the predicate corresponding to each column.

As described above, in the data generation method according to the present embodiment includes performing collation using the value of the table to acquire the subject and the predicate, and acquiring additional information indicating the restriction on the subject and the predicate from the RDF data set. The data generation method according to the present embodiment includes calculating the score of the predicate for each column using the acquired restriction to obtain the predicate corresponding to each column using the calculated score. The data generation method according to the present embodiment includes performing collation using the obtained predicate to extract the subject corresponding to each row.

As described above, the data generation method according to the present embodiment may derive an appropriate predicate representing each column by using ontology information such as constraint of the type of the subject and the domain of the predicate of the RDF data set. It is possible to extract an appropriate subject corresponding to each row by performing collation using an appropriate predicate. As a result, it is possible to improve the correctness of associating the table type data with the RDF data set, and it is possible to properly join the table type data and the RDF data set. Therefore, it is possible to reliably detect an appropriate triple corresponding to the value of the table data from the RDF data, and it is possible to effectively utilize the information of the RDF data set which the information in the table does not include.

<Hardware Configuration>

Figure 16:
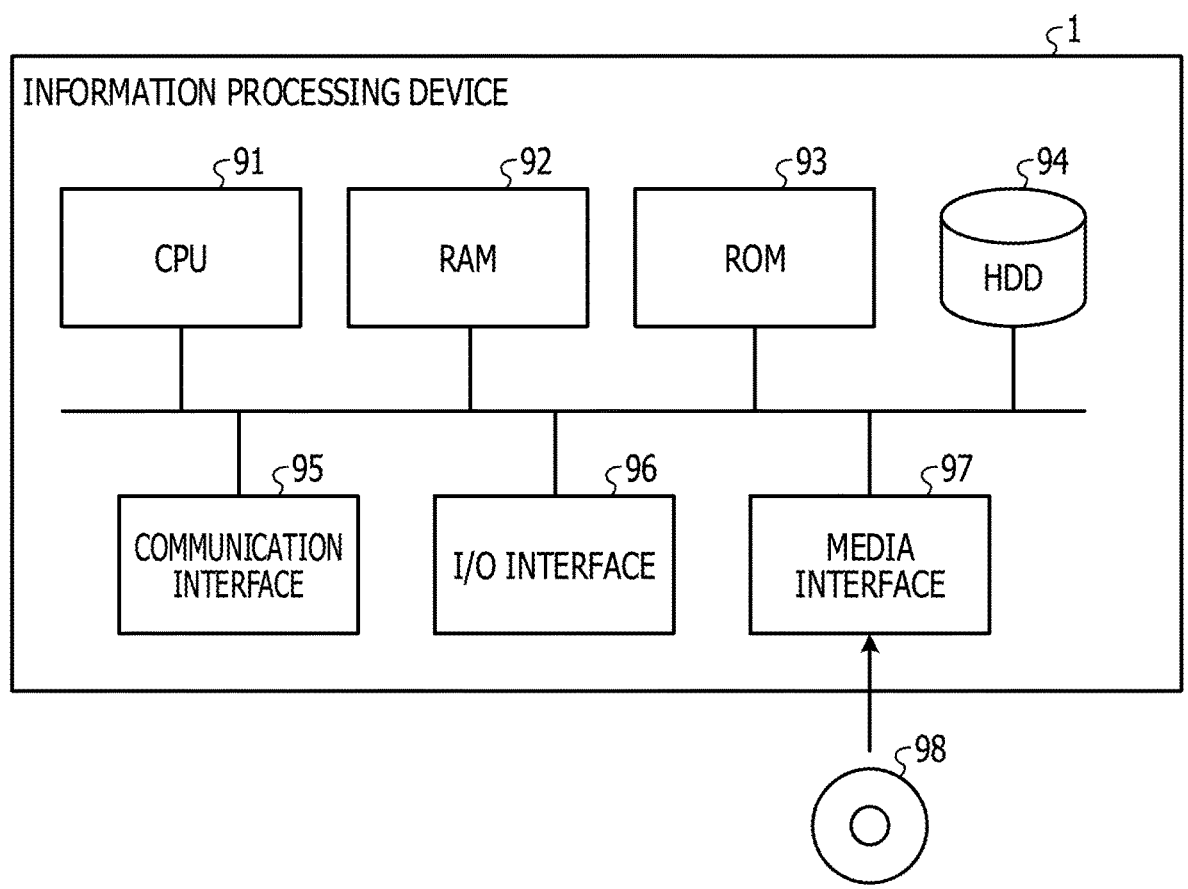
FIG. 16 is a diagram illustrating an example of the hardware configuration of the information processing device.

The information processing device 1 according to the above-described embodiment has a hardware configuration as illustrated in FIG. 16, for example. FIG. 16 is a diagram illustrating an example of the hardware configuration of the information processing device. The information processing device 1 includes a central processing unit (CPU) 91, a random access memory (RAM) 92, a read only memory (ROM) 93, and a hard disk drive (HDD) 94. The information processing device 1 includes a communication interface (I/F) 95, an input/output interface (I/F) 96, and a media interface (I/F) 97.

The CPU 91 operates based on a program stored in the ROM 93 or the HDD 94 and controls respective units. The ROM 93 stores a boot program executed by the CPU 91 when the information processing device 1 is activated, a program depending on the hardware of the information processing device 1, and the like.

The HDD 94 stores programs executed by the CPU 91, data used by such programs, and the like. The communication interface 95 receives data from another device via the network, transmits the data to the CPU 91, and transmits the data generated by the CPU 91 to another device via the network.

The CPU 91 controls an output device such as a display and a printer, and an input device such as a keyboard and a mouse via the input/output interface 96. The CPU 91 acquires data from the input device via the input/output interface 96. The CPU 91 outputs the generated data to the output device via the input/output interface 96.

The media interface 97 reads a program or data stored in a recording medium 98 and provides them to the CPU 91 via the RAM 92. The CPU 91 loads the program from the recording medium 98 onto the RAM 92 via the media interface 97 and executes the loaded program. The recording medium 98 includes an optical recording medium such as a digital versatile disc (DVD), a phase change rewritable disk (PD), a magneto-optic recording medium such as a magneto-optical disk (MO), a tape medium, a magnetic recording medium, a semiconductor memory, or the like.

For example, the RAM 92 and the HDD 94 of the information processing device 1 implement functions of the RDF data storage unit 11, the intermediate data DB 15, and the temporary storage unit 18. By executing the programs loaded on the RAM 92, the CPU 91 of the information processing device 1 implements the functions of the SPARQL processing unit 12, the first collation unit 13, the additional information acquisition unit 14, the score calculation unit 16, the second collation unit 17 and the result management unit 19. The CPU 91 of the information processing device 1 reads and executes these programs from the HDD 94. As another example, the CPU 91 of the information processing device 1 may read the programs from the recording medium 98, or may acquire these programs from another device via the network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method for data generation performed by a computer, the method comprising:
executing a collation process that includes
acquiring reference source data and reference destination data, the reference source data representing a first axis, the reference destination data representing a second axis and having a graph structure including a node and an edge, and
collating a node of the reference destination data by using a first query indicating, as object, a value of the acquired reference source data;
executing an identification process that includes
identifying a second node by using a second query, the second query indicating a first node as subject and a kind of the first node as predicate, the first node being a node of the reference destination data and sharing a first edge with a collation node, the collation node being the node collated by the collation process, the identified second node being a node representing the kind of the first node, and
identifying a third node by using a third query, the third query indicating the first edge as subject and a definition of a domain of the first edge as predicate, the identified third node being a node representing the domain of the first edge; and
executing a join process that includes
associating the reference source data with the reference destination data based on the second node and the third node.

2. The method according to claim 1,
wherein the join process is configured to associates the reference source data with the reference destination data by associating a value of the reference source data with a value of the reference destination data based on the second node and the third node, and a correlation strength of the first edge with respect to the reference source data.

3. The method according to claim 1,
wherein the reference source data is classified into items each of which represents a kind of a value on the first axis, and
wherein the join process is configured to
identify the first edge corresponding to each of the items based on the second node and the third node,
extract, for each row data having a plurality of values in a direction of the first axis of the reference source data, the first node that shares the first edge identified for the each item between the collation nodes and that is common in the each item, and
associate the reference source data with the reference destination data by associating the extracted each first node with the each row data.

4. An apparatus for data generation, the apparatus comprising:
a memory; and
a processor coupled to the memory; the processor being configured to
execute a collation process that includes
acquiring reference source data and reference destination data, the reference source data representing a first axis, the preference destination data representing a second axis and having a graph structure including a node and an edge, and
collating a node of the reference destination data by using a first query indicating, as object, a value of the acquired reference source data;
execute an identification process that includes
identifying a second node by using a second query, the second query indicating a first node as subject and a kind of the first node as predicate, the first node being a node of the reference destination data and sharing a first edge with a collation node, the collation node being the node collated by the collation process, the identified second node being a node representing the kind of the first node, and
identifying a third node by using a third query, the third query indicating the first edge as subject and a definition of a domain of the first edge as predicate, the identified third node being a node representing the domain of the first edge; and
execute a join process that includes
associating the reference source data with the reference destination data based on the second node and the third node.

5. The apparatus according to claim 4,
wherein the join process is configured to associates the reference source data with the reference destination data by associating a value of the reference source data with a value of the reference destination data based on the second node and the third node, and a correlation strength of the first edge with respect to the reference source data.

6. The apparatus according to claim 4,
wherein the reference source data is classified into items each of which represents a kind of a value on the first axis, and
wherein the join process is configured to
identify the first edge corresponding to each of the items based on the second node and the third node,
extract, for each row data having a plurality of values in a direction of the first axis of the reference source data, the first node that shares the first edge identified for the each item between the collation nodes and that is common in the each item, and
associate the reference source data with the reference destination data by associating the extracted each first node with the each row data.

7. A non-transitory computer-readable storage medium for storing a program which causes a processor to perform processing for data generation, the processing comprising:
executing a collation process that includes
acquiring reference source data and reference destination data, the reference source data representing a first axis, the reference destination data representing a second axis and having a graph structure including a node and an edge, and
collating a node of the reference destination data by using a first query indicating, as object, a value of the acquired reference source data;
executing an identification process that includes
identifying a second node by using a second query, the second query indicating a first node as subject and a kind of the first node as predicate, the first node being a node of the reference destination data and sharing a first edge with a collation node, the collation node being the node collated by the collation process, the identified second node being a node representing the kind of the first node, and
identifying a third node by using a third query, the third query indicating the first edge as subject and a definition of a domain of the first edge as predicate, the identified third node being a node representing the domain of the first edge; and
executing a join process that includes
associating the reference source data with the reference destination data based on the second node and the third node.

8. The non-transitory computer-readable storage medium according to claim 7,
wherein the join process is configured to associates the reference source data with the reference destination data by associating a value of the reference source data with a value of the reference destination data based on the second node and the third node, and a correlation strength of the first edge with respect to the reference source data.

9. The non-transitory computer-readable storage medium according to claim 7,
wherein the reference source data is classified into items each of which represents a kind of a value on the first axis, and
wherein the join process is configured to
identify the first edge corresponding to each of the items based on the second node and the third node,
extract, for each row data having a plurality of values in a direction of the first axis of the reference source data, the first node that shares the first edge identified for the each item between the collation nodes and that is common in the each item, and
associate the reference source data with the reference destination data by associating the extracted each first node with the each row data.

* * * * *